United States Patent
Ogura

(10) Patent No.: US 10,341,887 B2
(45) Date of Patent: Jul. 2, 2019

(54) COMMUNICATION SYSTEM, BASE STATION, COMMUNICATION METHOD, AND NON-TRANSITORY COMPUTER READABLE MEDIUM STORING PROGRAM

(71) Applicant: NEC Corporation, Tokyo (JP)

(72) Inventor: Daisuke Ogura, Tokyo (JP)

(73) Assignee: NEC Corporation, Tokyo (JP)

( * ) Notice: Subject to any disclaimer, the term of this patent is extended or adjusted under 35 U.S.C. 154(b) by 169 days.

(21) Appl. No.: 15/307,464

(22) PCT Filed: Feb. 24, 2015

(86) PCT No.: PCT/JP2015/000905
§ 371 (c)(1),
(2) Date: Oct. 28, 2016

(87) PCT Pub. No.: WO2015/170433
PCT Pub. Date: Nov. 12, 2015

(65) Prior Publication Data
US 2017/0055169 A1    Feb. 23, 2017

(30) Foreign Application Priority Data
May 7, 2014    (JP) .................... 2014-095789

(51) Int. Cl.
*H04W 24/08*    (2009.01)
*H04W 76/15*    (2018.01)
(Continued)

(52) U.S. Cl.
CPC ............ *H04W 24/08* (2013.01); *H04L 47/26* (2013.01); *H04W 28/02* (2013.01); *H04W 72/04* (2013.01);
(Continued)

(58) Field of Classification Search
CPC .......... H04W 36/0055; H04W 84/045; H04W 88/06; H04W 92/20; H04W 36/04
See application file for complete search history.

(56) References Cited

U.S. PATENT DOCUMENTS

2008/0095116 A1* 4/2008 Kim .................. H04L 1/1841
370/331
2014/0269632 A1* 9/2014 Blankenship ....... H04W 76/025
370/336
(Continued)

OTHER PUBLICATIONS

Ericsson, "Introduction of Dual Connectivity (RAN3 input for Overall Signaling Diagrams)," 3GPP TSG-RAN WG2 #85bis, R2-141860 (R3-140975), Change Request, Valencia, Spain, 15 pages (Mar. 31-Apr. 4, 2014).
(Continued)

*Primary Examiner* — Will W Lin
(74) *Attorney, Agent, or Firm* — Wilmer Cutler Pickering Hale and Dorr LLP

(57) ABSTRACT

A communication system according to the present invention includes a PDCP control base station (10) configured to execute a process in a PDCP layer, and an RLC control base station (20) configured to execute a process in an RLC layer on data transmitted by the PDCP control base station (10) and transmit the data on which the process in the RLC layer has been executed to a mobile station (30). The RLC control base station (20) transmits a response message to the PDCP control base station (10) when the data has been successfully transmitted to the mobile station (30). When the PDCP control base station (10) receives the response message, the PDCP control base station (10) transmits data to be transmitted next to the RLC control base station (20).

14 Claims, 17 Drawing Sheets

(51) Int. Cl.
| | |
|---|---|
| H04W 72/04 | (2009.01) |
| H04W 28/02 | (2009.01) |
| H04W 76/02 | (2009.01) |
| H04L 12/825 | (2013.01) |
| H04W 16/32 | (2009.01) |
| H04L 1/16 | (2006.01) |
| H04W 84/04 | (2009.01) |
| H04W 92/20 | (2009.01) |

(52) U.S. Cl.
CPC ......... *H04W 76/025* (2013.01); *H04W 76/15* (2018.02); *H04L 1/16* (2013.01); *H04W 16/32* (2013.01); *H04W 84/045* (2013.01); *H04W 92/20* (2013.01)

(56) References Cited

U.S. PATENT DOCUMENTS

| | | | | |
|---|---|---|---|---|
| 2016/0088528 | A1* | 3/2016 | Uchino | H04W 36/0055 370/331 |
| 2016/0183158 | A1* | 6/2016 | Decarreau | H04W 36/02 370/328 |
| 2017/0181185 | A1* | 6/2017 | Lee | H04W 80/02 |

OTHER PUBLICATIONS

Ericsson, "Introduction to Dual Connectivity," 3GPP TSG-RAN WG3 Meeting #83bis, R3-140824, Change Request, San Jose del Cabo, Mexico, 31 pages (Mar. 31-Apr. 4, 2014).
Ericsson, "PDCP reordering in dual connectivity," 3GPP TSG-RAN WG2 #85bis, Tdoc R2-141760, Agenda Item 7.1.2, Valencia, Spain, 11 pages (Mar. 31-Apr. 4, 2014).
Extended European Search Report issued by the European Patent Office for European Application No. 15788907.2 dated Dec. 20, 2017 (10 pages).
NEC Corporation, "Security aspects for SeNB addition and key change," 3GPP TSG RAN2 Meeting #85bis, R2-141624, Agenda Item 7.1.3, Valencia, Spain, 5 pages (Mar. 31-Apr. 4, 2014).
Huawei, "Flow Control for Split Bearers," 3GPP TSG RAN WG3 Meeting #83bis, R3-140560, Agenda Item, 20.1.4, San Jose del Cabo, Mexico, 5 pages (Mar. 31-Apr. 4, 2014).
Japanese Office Action issued by the Japan Patent Office for Japanese Application No. 2016-517800 dated Aug. 15, 2017 (6 pages).
Nokia Siemens Networks, Nokia Corporation, "Data split options and considerations on U-plane protocol architecture for dual-connectivity," 3GPP TSG-RAN WG2 Meeting #81 bis, R2-131054, Agenda Item 7.2, Chicago, USA, 10 pages (Apr. 15-19, 2013).
International Search Report corresponding to PCT/JP2015/000905, dated May 19, 2015, 2 pages.
3GPP TR 36.932 V12.1.0; 3rd Generation Partnership Project; Technical Specification Group Radio Access Network; Scenarios and requirements for small cell enhancements for E-UTRA and E-UTRAN (Release 12), Mar. 2013, 14 pages.
BlackBerry UK Limited, Further Discussion on U-Plane Protocol Architecture Designs, R2-132442, 3GPPTSG RAN WG2, Aug. 9, 2013, paragraph 2.1, Aug. 19-23, 2013, pp. 1-6.
Ericsson, Nokia Corporation, Nokia Siemens Networks, Sequence Number Handling at PDCP, R2-081341, 3GPP TSG-RAN WG2, paragraph 1; Feb. 11-15, 2008, 8 pages.
Ericsson, Comparison of intra-bearer UP architectures, R2-133603, paragraph 2.2, 3GPP TSG-RAN WG2, Oct. 7-11, 2013, 8 pages.
InterDigital Communications, User Plane Architecture for Dual-Connectivity, R2-131939, 3GPP TSG-RAN WG2, paragraph 2.2.3, 2.2.4, May 20-24, 2013, 7 pages.
NSN, Nokia Corporation, SeNB change and interMeNB handover procedure, R2-140371, 3GPP TSG-RAN WG2, Feb. 10-14, 2014, paragraph 10.1.2.X.Z, 6 pages.
Ericsson, PDCP reordering for split bearers, R2-140661, 3GPP TSG-RAN WG2, Feb. 10-14, 2014, paragraph 2.2, 3 pages.
Intel Corporation, Detailed signaling procedure for dual connectivity, R2-133491, 3GPP TSG-RAN2, Oct. 7-11, 2013, paragraph 3.1, 5 pages.
Huawei, HiSilicon, The order and direction of messages for SeNB (re)configuration, R2-140059, 3GPP TSG-RAN WG2, Feb. 10-14, 2014, paragraph 2.1, 6 pages.

* cited by examiner

| IE/Group Name | Presence | Range | IE type and reference | Semantics description | Criticality | Assigned Criticality |
|---|---|---|---|---|---|---|
| PDCP-SN | M | | INTEGER (0..4095) | | | |
| HFN | M | | INTEGER (0..1048575) | | | |

Fig. 11

| IE/Group Name | Presence | Range | IE type and reference | Semantics description | Criticality | Assigned Criticality |
|---|---|---|---|---|---|---|
| PDCP-SN#1 | M | | INTEGER (0..4095) | | | |
| ... | ... | ... | ... | ... | ... | ... |
| PDCP-SN#n | | | INTEGER (0..4095) | | | |
| HFN | M | | INTEGER (0..1048575) | | | |

Fig. 12

| IE/Group Name | Presence | Range | IE type and reference | Semantics description | Criticality | Assigned Criticality |
|---|---|---|---|---|---|---|
| Transmission Status Of DL PDCP PDUs | M | | BIT STRING (2048 or 4096) | | | |
| HFN | M | | INTEGER (0..1048575) | | | |

Fig. 13

| Octets | 8 | 7 | 6 | 5 | 4 | 3 | 2 | 1 |
|---|---|---|---|---|---|---|---|---|
| 1 | Version | | | PT | (*) | E | S | PN |
| 2 | Message Type | | | | | | | |
| 3 | Length (1st Octet) | | | | | | | |
| 4 | Length (2nd Octet) | | | | | | | |
| 5 | Tunnel Endpoint Identifier (1st Octet) | | | | | | | |
| 6 | Tunnel Endpoint Identifier (2nd Octet) | | | | | | | |
| 7 | Tunnel Endpoint Identifier (3rd Octet) | | | | | | | |
| 8 | Tunnel Endpoint Identifier (4th Octet) | | | | | | | |
| 9 | Sequence Number (1st Octet) | | | | | | | |
| 10 | Sequence Number (2nd Octet) | | | | | | | |
| 11 | N-PDU Number | | | | | | | |
| 12 | Next Extension Header Type | | | | | | | |

| Next Extension Header Field Value | Type of Extension Header |
|---|---|
| 0000 0000 | No more extension headers |
| 0000 0001 | Reserved—Control Plane only |
| 0000 0010 | Reserved—Control Plane only |
| 0100 0000 | UDP Port. Provides the UDP Source Port of the triggering message |
| 1100 0000 | PDCP PDU Number [4]-[5] |
| 1100 0001 | Reserved—Control Plane only |
| 1100 0010 | Reserved—Control Plane only |
| 1100 0100 | PDCP S/N + HFN |

Fig. 16

| Octets | |
|---|---|
| 1 | Extension Header Length |
| 2<br>3 | PDCP-SN(12bit)+HFN(20bit) |
| m+1 | Next Extension Header Type |

| Message Type value(Decimal) | Message |
|---|---|
| 1 | Echo Request |
| 2 | Echo Response |
| 3-25 | Reversed in 3GPP TS 32.295[8] and 3GPP TS29.060[6] |
| 26 | Error Indication |
| 27-30 | Reversed in 3GPP TS 29.060[6] |
| 31 | Supported Extension Headers Notification |
| 32-252 | Reversed in 3GPP TS 29.060[6] |
| 253 | PDCP S/N + HFN |
| 254 | End Marker |
| 255 | G-PDU |

Fig. 17

COMMUNICATION SYSTEM, BASE STATION, COMMUNICATION METHOD, AND NON-TRANSITORY COMPUTER READABLE MEDIUM STORING PROGRAM

CROSS-REFERENCE TO RELATED APPLICATIONS

This application is a national stage application of International Application No. PCT/JP2015/000905 entitled "COMMUNICATION SYSTEM, BASE STATION, COMMUNICATION METHOD, AND NON-TRANSITORY COMPUTER READABLE MEDIUM STORING PROGRAM," filed on Feb. 24, 2015, which claims the benefit of the priority of Japanese Patent Application No. 2014-095789 filed on May 7, 2014, the disclosures of each of which are hereby incorporated by reference in their entirety.

TECHNICAL FIELD

The present invention relates to a communication system, a base station, a communication method, and a program, and to, for example, a communication system, a base station, a communication method, and a program that transmit data to mobile stations.

BACKGROUND ART

3GPP (3rd Generation Partnership Project) specifies a protocol used between base stations and mobile stations in order to standardize communication between the base stations and mobile stations. For example, 3GPP specifies PDCP for executing concealment of data, data compression, and the like and RLC for executing retransmission control, duplicate detection, and the like between the base stations and mobile stations.

It is assumed in a configuration of a communication system specified by 3GPP that processes in the PDCP (Packet Data Control Protocol) layer and processes in the RLC (Radio Link Control) layer are executed by the same device. To be more specific, data used in the PDCP layer and the RLC layer is stored in a common buffer, and execution of the processes in the PDCP layer and execution of the processes in the RLC layer are synchronized.

In recent years, 3GPP has been examining a configuration regarding Small Cells (dual connectivity). It is assumed in the configuration regarding Small Cells that the processes in the PDCP layer and the processes in the RLC layer are performed by physically separate devices. Non Patent Literature 1 discloses a configuration of

CITATION LIST

Non Patent Literature

Non Patent Literature 1: 3GPP TR 36.932 V12.1.0 (2013-03) 3rd Generation Partnership Project; Technical Specification Group Radio Access Network; Scenarios and requirements for small cell enhancements for E-UTRA and E-UTRAN (Release 12)

SUMMARY OF INVENTION

Technical Problem

However, when the processes in the PDCP layer and the processes in the RLC layer are performed by physically separate devices, there needs to be separate buffers for the processes in the PDCP layer and the processes in the RLC layer, respectively. In such a case, for example, the device that executes the processes in the PDCP layer cannot recognize as to whether or not data output to the device that executes the processes in the RLC layer has been successfully transmitted to UE. This is because the device that executes the processes in the PDCP layer cannot refer to the buffer used in the processes in the RLC layer. For this reason, a transmission status of data cannot be synchronized between the PDCP layer and the RLC layer.

For example, when data is sequentially transmitted by the device that executes the processes in the PDCP layer to the device that executes the processes in the RLC layer, the device that executes the processes in the RLC layer sometimes cannot transmit data to mobile stations, and the data is retained in the buffer in the device that executes the processes in the RLC layer. In such a case, there is a problem that when the amount of data transmitted by the PDCP layer is increased, data that exceeds an allowable amount of the buffer in the device that executes the processes in the RLC layer is discarded.

An object of the present invention is to provide a communication system, a base station, a communication method, and a program that can synchronize a transmission status of data between the PDCP layer and the RLC layer.

Solution to Problem

In a first exemplary aspect of the present invention, a communication system includes: a first base station configured to execute a process in a PDCP layer; and a second base station configured to execute a process in an RLC layer on data transmitted by the first base station and transmit the data on which the process in the RLC layer has been executed to a mobile station. The second base station transmits a response message to the first base station when the data has been successfully transmitted to the mobile station, and when the first base station receives the response message, the first base station transmits data to be transmitted next to the second base station.

In a second exemplary aspect of the present invention, a base station includes: a PDCP control unit configured to execute a process in a PDCP layer; an RLC control unit configured to execute a process in an RLC layer on data processed by the PDCP control unit; a storage unit configured to temporarily store the data processed by the RLC control unit; and a communication unit configured to transmit the data stored in the storage unit to a mobile station. The PDCP control unit is configured not to refer to the storage unit. The RLC control unit transmits a response message to the PDCP control unit when the communication unit has successfully transmitted the data to the mobile station. When the PDCP control unit receives the response message, the PDCP control unit processes data to be transmitted next in the PDCP layer.

In a third exemplary embodiment of the present invention, a communication method includes: executing a process in an RLC layer on data transmitted by a first base station by a second base station, a process in a PDCP layer having been executed on the data; transmitting the data to a mobile station, the process in the RLC layer having been executed on the data by the second base station; transmitting a response message by the second base station to the first base station when the data is successfully transmitted by the second base station to the mobile station; and transmitting data to be transmitted next by the first base station to the second base station when the first base station receives the response message.

In a fourth exemplary aspect of the present invention, a program causes a computer including a PDCP control unit for executing a process in a PDCP layer and an RLC control unit for executing a process in an RLC layer on data processed by the PDCP control unit to execute: temporarily storing the data processed by the RLC control unit in storage unit, the PDCP control unit not being able to refer to the storage unit; transmitting the data stored in the storage unit to a mobile station; and transmitting a response message to the PDCP control unit when the RLC control unit has successfully transmitted the data to the mobile station. The PDCP control unit processes data to be transmitted next in the PDCP layer when the PDCP control unit receives the response message.

Advantageous Effects of Invention

According to the present invention, it is possible to provide a communication system, a base station, a communication method, and a program that can synchronize a transmission status of data between the PDCP layer and the RLC layer.

BRIEF DESCRIPTION OF DRAWINGS

FIG. 11 is a drawing for describing an SN STATUS TRANSFER message according to the sixth exemplary embodiment;

FIG. 12 is a drawing for describing the SN STATUS TRANSFER message according to the sixth exemplary embodiment;

FIG. 13 is a drawing for describing the SN STATUS TRANSFER message according to the sixth exemplary embodiment;

FIG. 14 is a drawing for describing a GTP-U Message according to the sixth exemplary embodiment;

FIG. 15 is a drawing for describing the GTP-U Message according to the sixth exemplary embodiment;

FIG. 16 is a drawing for describing the GTP-U Message according to the sixth exemplary embodiment;

FIG. 17 is a drawing for describing the GTP-U Message according to the sixth exemplary embodiment;

DESCRIPTION OF EMBODIMENTS

First Exemplary Embodiment

Hereinafter, exemplary embodiments of the present invention will be described with reference to the drawings. Firstly, a configuration example of a communication system according to a first exemplary embodiment of the present invention will be described with reference to FIG. 1. The communication system of FIG. 1 includes a PDCP control base station 10, an RLC control base station 20, and a mobile station 30.

The PDCP control base station 10 and the RLC control base station 20 may be computer devices that execute functions by CPUs inside executing programs. The mobile station 30 may be, for example, a mobile phone terminal, a smartphone terminal, a tablet terminal, or the like. Alternatively, the mobile station 30 may be a computer device such as a personal computer or the like including a communication function.

The PDCP control base station 10 executes processes in the

PDCP layer. The processes in the PDCP layer may be, for example, concealment of data, header compression, and the like. The PDCP control base station 10 transmits data on which the processes in the PDCP layer have been executed to the RLC control base station 20.

The RLC control base station 20 executes the processes in the RLC layer on the data transmitted by the PDCP control base station 10. The processes in the RLC layer may be retransmission control, duplicate data detection, sorting of data, and the like. The RLC control base station 20 transmits data on which the processes in the RLC layer are executed to the mobile station 30.

When the RLC control base station 20 has successfully transmitted the data to the mobile station 30, the RLC control base station 20 transmits a response message to the PDCP control base station 10. The response message indicates that the RLC control base station 20 has successfully transmitted the data to the mobile station 30.

The RLC control base station 20 may evaluate that the data has been successfully transmitted to the mobile station 30, for example, when the mobile station 30 has transmitted a response signal indicating that the mobile station 30 has successfully received the data after the RLC control base station 20 has transmitted the data to the mobile station 30.

When the PDCP control base station 10 receives the response message from the RLC control base station 20, the PDCP control base station 10 transmits data, which should be transmitted next, to the RLC control base station 20. To be more specific, when the PDCP control base station 10 receives the response message, the PDCP control base station 10 executes the processes in the PDCP layer on the data, which should be transmitted next, and transmits the data on which the processes in the PDCP layer have been executed to the RLC control base station 20.

Figure 1:
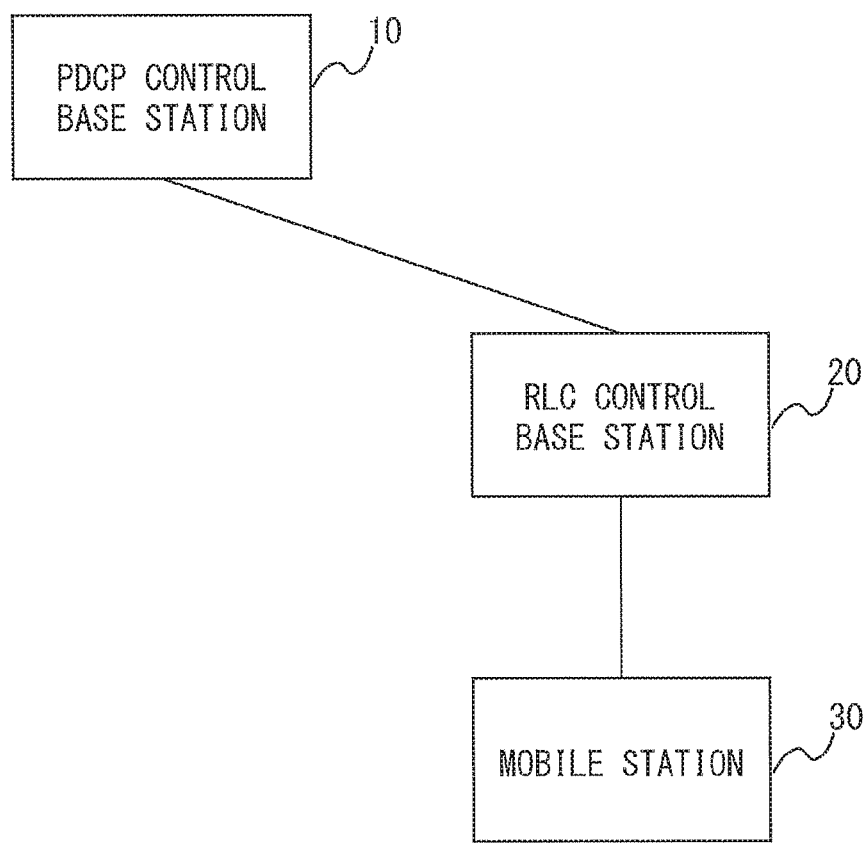
FIG. 1 is a configuration diagram of a communication system according to a first exemplary embodiment.

As described above, the RLC control base station 20 can transmit information indicating that the data has been successfully transmitted to the mobile station 30 to the PDCP control base station 10 by using the communication system of FIG. 1. By doing so, the PDCP control base station 10 can evaluate as to whether or not communication between the RLC control base station 20 and the mobile station 30 is successfully performed even when the PDCP control base station 10 and the RLC control base station 20 are physically different devices.

In most cases, when the RLC control base station 20 has successfully transmitted the data to the mobile station 30, the RLC control base station 20 deletes data held in a buffer. Therefore, as the PDCP control base station 10 transmits data, which should be transmitted to the RLC control base station 20 next, to the RLC control base station 20 after the response message is transmitted by the RLC control base station 20, it is possible to prevent data that exceeds an allowable amount of the buffer of the RLC control base station 20 from being accumulated in the buffer As the PDCP control base station 10 transmits the data, which should be transmitted to the RLC control base station 20 next, to the RLC control base station 20 after the response message is transmitted by the RLC control base station 20, it is possible to synchronize the data transmitted by the PDCP control base station 10 to the RLC control base station 20 with the data transmitted by the RLC control base station 20 to the mobile station 30. That is, the data transmitted by the PDCP control base station 10 can be synchronized with the data received by the mobile station 30.

Second Exemplary Embodiment

Figure 2:
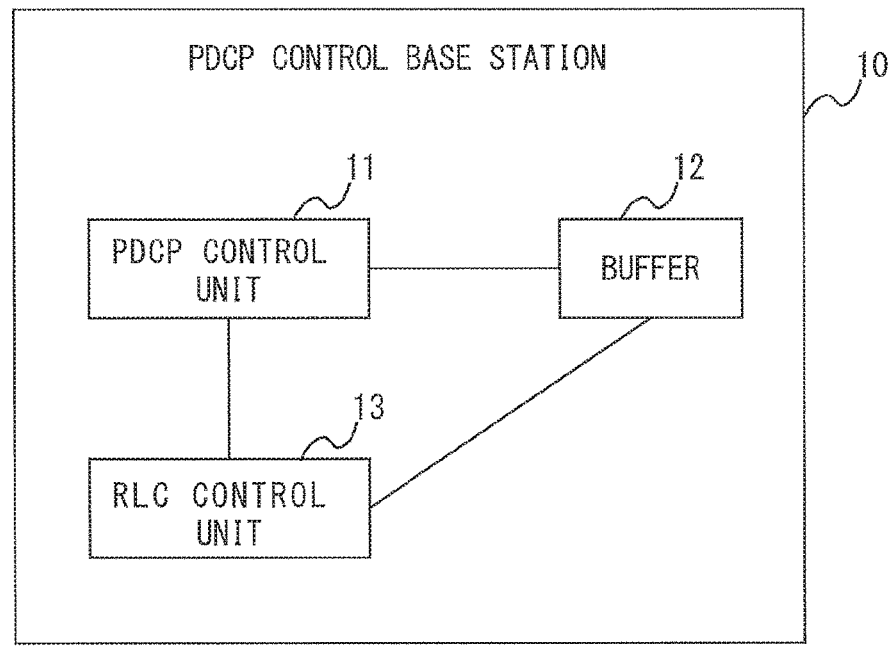
FIG. 2 is a configuration diagram of a PDCP control base station according to a second exemplary embodiment.

Next, a configuration example of a PDCP control base station 10 according to a second exemplary embodiment of the present invention will be described with reference to FIG. 2. The PDCP control base station 10 includes a PDCP control unit 11, a buffer 12, and an RLC control unit 13. For example, CPUs (Central Processing Units) may be used for the PDCP control base station 10 and the RLC control unit 13. Further, a memory such as a ROM (Read Only Memory), a RAM (Random Access Memory), or the like may be used for the buffer 12.

The PDCP control unit 11 extracts data stored in the buffer 12 and executes a PDCP process. The PDCP control unit 11 outputs data on which the PDCP process has been executed to the RLC control unit 13 and to the RLC control base station 20. For example, when the PDCP control unit 11 outputs a predetermined number of pieces of data to the RLC control unit 13, the PDCP control unit 11 may transmit a predetermined number of pieces of next data to the RLC control base station 20. Alternatively, the PDCP control unit 11 may output data processed within a predetermined period to the RLC control unit 13 and then transmit data processed within a next predetermined period to the RLC control base station 20. In a further alternative, the PDCP control unit 11 may distribute data to be transmitted to the RLC control unit 13 and the RLC control base station 20 at arbitrary timings.

Moreover, the PDCP control unit 11 may store the data on which the PDCP process has been executed in the buffer 12 and notify the RLC control unit 13 that the PDCP process has been executed. The buffer 12 may store data on which the PDCP process has not been executed yet in a memory space or a memory region different from a memory space or a memory region that stores data on which the PDCP process has been executed.

Furthermore, the PDCP control unit 11 may transmit all data on which the PDCP process has been executed to the RLC control base station 20. In this case, the RLC control unit 13 will be unnecessary.

The RLC control unit 13 executes an RLC process on the data output by the PDCP control unit 11 or the data extracted from the buffer 12. The data extracted from the buffer 12 is the data on which the PDCP control unit 11 has executed the PDCP process and then stored in the buffer 12. The RLC control unit 13 transmits the data on which the RLC process has been executed to the mobile station 30

The data which will be transmitted to the RLC control unit 13 or the RLC control base station 20 by the PDCP control unit 11 may be referred to as a PDCP-PDU (PDCP-Protocol Data Unit).

Figure 3:
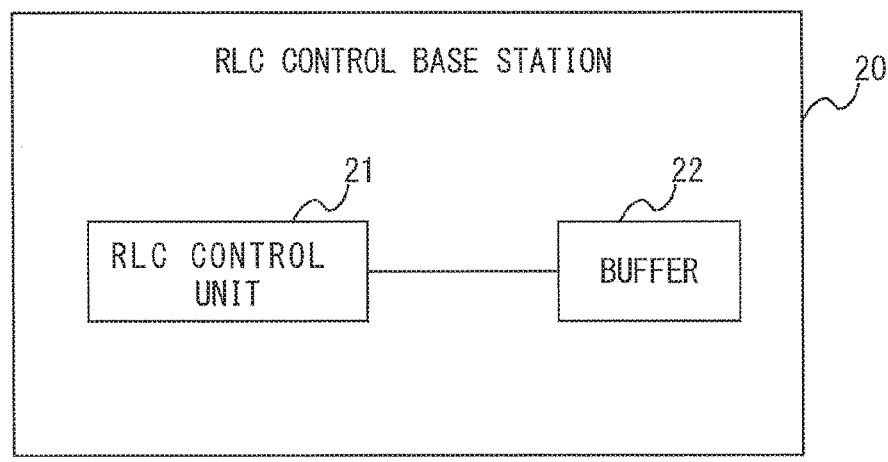
FIG. 3 is a configuration diagram of an RLC control base station according to the second exemplary embodiment.

Next, a configuration example of the RLC control base station 20 according to the second exemplary embodiment of the present invention will be described with reference to FIG. 3. The RLC control base station 20 includes an RLC control unit 21 and a buffer 22. For example, a CPU (Central Processing Unit) may be used for the RLC control unit 21. Further, a memory such as a ROM (Read Only Memory), a RAM (Random Access Memory), or the like may be used for the buffer 22.

The buffer 22 temporarily stores the data transmitted by the PDCP control base station 10. The data transmitted by the PDCP control base station 10 has been subjected to the PDCP process by the PDCP control base station 10.

The RLC control unit 21 extracts the data stored in the buffer 22. Then, the RLC control unit 21 executes the RLC process on the data extracted from the buffer 22. The RLC control unit 21 transmits the data on which the RLC process has been executed to the mobile station 30.

The mobile station 30 receives the data on which the RLC control has been executed from the PDCP control base station 10 and the RLC control base station 20. Reception of data transmitted by two or more base stations by the mobile station 30 is referred to as dual connectivity. Further, as in the case of the PDCP control base station 10, a base station referred to as a macro base station with a communication area of a few kilometer radius may be used for a base station that executes the PDCP process and the RLC process. The RLC control base station 20 executes only the RLC process and may be used to complement the function of the PDCP control base station 10. The RLC control base station 20 may be referred to as a femto base station, a micro base station, or the like that has a communication area partially overlapping a communication area of the PDCP control base station 10.

Next, a comparison example for describing a process according to the second exemplary embodiment of the present invention will be described with reference to FIG. 19. In the comparison example, a problem that occurs when the present invention is not incorporated will be described in detail.

A PDCP-SN (PDCP-Sequence Number) is set in the data transmitted from the PDCP layer to the RLC layer. In FIGS. 19, 0 to 4095 indicate PDCP-SNs. Moreover, an HFN (Hyper Frame Number) is a parameter used to conceal data transmitted from the RLC layer to UE (User Equipment). The UE is used by 3GPP as a specific name of the mobile station. The UE decodes the data transmitted by the RLC control base station 20 using an HFN that has the same value as that of the HFN used by the RLC control unit 21. 3GPP defines three types of PDCP-SN, namely, Long PDCP SN (12 bits: 0 to 4095), Short PDCP-SN (7 bits: 0 to 127), and Extended PDCP-SN (15 bits: 0 to 32767). The Long PDCP SN is commonly used.

The UE will not obtain the HFN value from the PDCP control base station 10 and the RLC control base station 20. This is to prevent the HFN value, for example, from being intercepted by a third party when the HFN value is transmitted by the PDCP control base station 10 or the RLC control base station 20 to the UE via a wireless line. When the HFN value used as an initial value is determined, the UE increments a value of the PDCP-SN for the data and increments the HFN value in order to decode the data. That is, the data transmitted by the PDCP control base station 10 needs to be synchronized with the data received by the UE in order to match the HFN value used by the PDCP control base station 10 to conceal the data with the HFN value used by the UE to decode the data. A relationship between the HFN and the PDCP-SN will be described below. 3GPP specifies a COUNT value parameter with a size of 32 bits as a parameter used to conceal data and also specifies that the COUNT value includes an HFN and a PDCP SN. Therefore, the size of the HFN is changed according to the type of the PDCP SN. For example, when the Long PDCP SN is used, 32 bits–Long PDCP SN(12 bits)=20 bits. The size of this difference, i.e., 20 bits (0 to 1048575) is a range of the HFN. For example, the COUNT value generated by the equation HFN+PDCP SN may be used as a parameter for encoding and decoding data to conceal the data.

Figure 19:
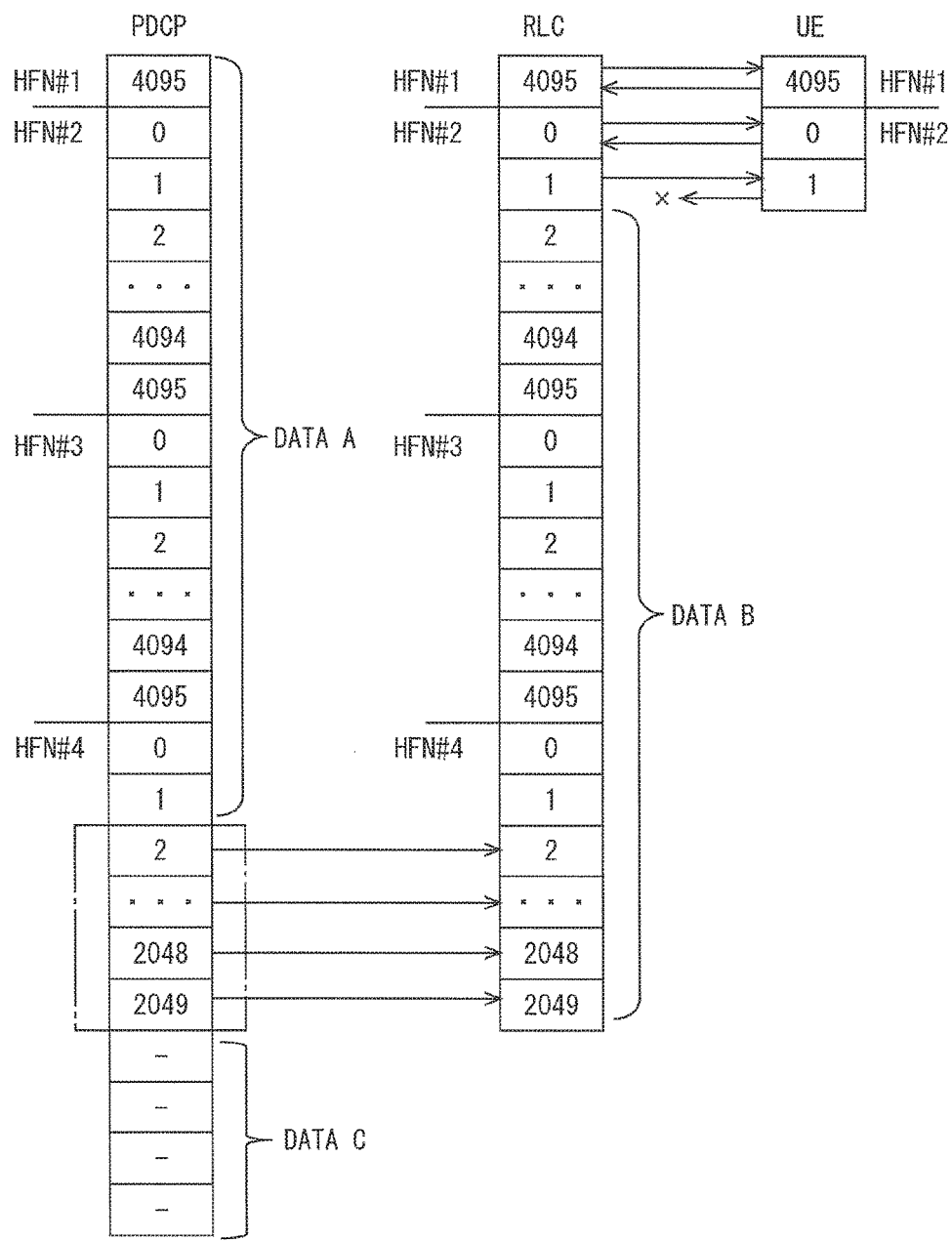
FIG. 19 is a comparison diagram used to describe an operation according to the exemplary embodiments.

In FIG. 19, data shown below the term PDCP indicates data stored in the buffer 12 of the PDCP control base station 10. Data shown below the term RLC indicates data stored in the buffer 22 of the RLC control base station 20. Data shown below the term UE indicates data held by the UE.

HFN#1 to 4 shown beside the data in which PDCP-SNs are set indicate specific values of the HFNs used to conceal the data. For example, the data that is shown at the top of the data stored in the buffer 12 of the PDCP control base station 10 indicates that the PDCP-SN is 4095, and the data is concealed using HFN#1. The data that is shown at the top of the data stored in the buffer 22 of the RLC control base station 20 indicates that the PDCP-SN is 4095, and the data is concealed using HFN#1. The data that is shown at the top of the data held in the UE indicates that the UE decodes the data transmitted by the RLC control base station 20 using HFN#1.

Among the data pieces held in the buffer 12 of the PDCP control base station 10, the data indicated as the data A has already been transmitted to the RLC control base station 20. That is, the same data as the data shown in the data A is stored in the buffer 22 of the RLC control base station 20. The PDCP control unit 11 of the PDCP control base station 10 may delete the data A that has already been transmitted to the RLC control base station 20 from the buffer 12.

Further, among the data pieces held in the buffer 12 of the PDCP control base station 10, the data surrounded by the dashed-dotted line is managed by a PDCP re-ordering window. The PDCP re-ordering window is a window that manages PDCP-PDUs within a range of 0 to 2047. When the Short PDCP-SN is used, the size of the PDCP re-ordering window will be half of the size of the PDCP-SN. Thus, the PDCP re-ordering window manages the PDCP-PDUs within a range of 0 to 63. When the Extended PDCP-SN is used, the size of the PDCP re-ordering window will be half of the size of the PDCP-SN. Thus, the PDCP re-ordering window manages the PDCP-PDUs within a range of 0 to 16383. The PDCP-SNs are allocated to the PDCP-PDUs inside the PDCP re-ordering window, and then the PDCP-PDUs are transmitted to the RLC control base station 20. Further, the PDCP control unit 11 sequentially slides the PDCP re-ordering window, allocates the PDCP-SN(s) to the data stored in the buffer 12 to which the PDCP-SN(s) has not been allocated, and then transmits the data to the RLC control base station 20. The PDCP control unit 11 slides the PDCP re-ordering window in a direction in which the PDCP-SN is increased.

Among the data pieces held in the buffer 12 of the PDCP control base station 10, the data indicated as the data C is data to which the PDCP-SN(s) is not allocated and may be referred to as fresh data.

In this example, the data indicated as the data A and the data inside the PDCP re-ordering window are stored in the buffer 22 of the RLC control base station 20.

The RLC control unit 21 transmits the data that is stored in the buffer 22 and that has been concealed using any one of HFN#1 to 4 to the UE. When the UE receives the data, the UE transmits a response message indicating that the UE has successfully received the data to the RLC control base station 20.

In FIG. 19, it is shown that the RLC control unit 21 of the RLC control base station 20 received the response message for the data of PDCP-SN: 4095 that has been concealed using HFN#1 and the data of PDCP-SN: 0 that has been concealed using HFN#2. It is also shown in FIG. 19 that the RLC control unit 21 has not received the response message for the data of PDCP-SN: 1 that has been concealed using HFN#1.

In such a case, the RLC control unit 21 cannot transmit the data B from PDCP-SN: 2 onward that has been concealed using HFN#2 to the UE. As the PDCP control unit 11 of the PDCP control base station 10 cannot recognize as to whether or not the data has been successfully transmitted by the RLC control base station 20 to the UE, the PDCP control unit 11 of the PDCP control base station 10 continues to slide the PDCP re-ordering window and continues to transmit the data to the RLC control base station 20. However, as the RLC control base station 20 cannot transmit the data B from PDCP-SN: 2 onward that has been concealed using HFN#2 to the UE, and the exceeded data is discarded when the amount of data stored in the buffer 22 exceeds an allowable amount of data stored in the buffer 22. For example, if old data in the buffer 22 is discarded, the data of PDCP-SN: 2 that has been concealed using HFN#2 is discarded first. Alternatively, if the buffer 22 can store the data from the data of PDCP-SN: 1 that has been concealed using HFN#1 to the data of PDCP-SN: 1 that has been concealed using HFN#4, the data received by the buffer 22 from the data of PDCP-SN: 2 that has been concealed using HFN#4 onward may be discarded.

In FIG. 19, it is shown that the data transmitted by the PDCP control base station 10 could be continuously accumulated in the buffer 22 of the RLC control base station 20, and the data could be discarded.

Figure 4:
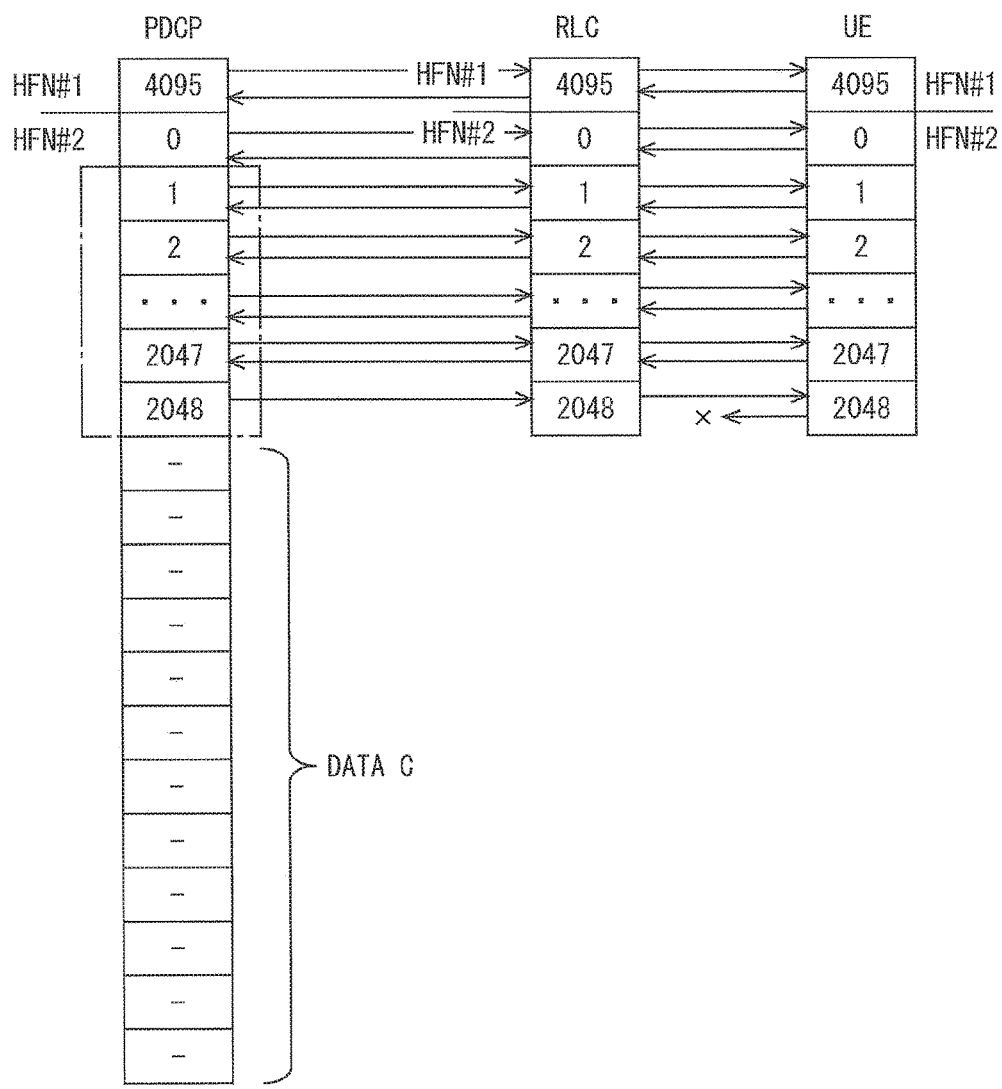
FIG. 4 is a drawing for describing a synchronization process of data according to the second exemplary embodiment.

Next, a synchronization process of data according to the second exemplary embodiment of the present invention will be described with reference to FIG. 4. In the process shown in FIG. 4, in response to the response message transmitted by the UE, the RLC control base station 20 transmits a response message indicating that the data has been successfully transmitted to the UE to the PDCP control base station 10. The RLC control base station 20 transmits the response message for each of the PDCP-PDUs to the PDCP control base station 10. Each piece of data to which the PDCP-SN is allocated represents one PDCP-PDU. Further, the RLC control base station 20 may transmit the response message to the PDCP control base station 10 when the RLC control base station 20 successfully receives the data transmitted by the PDCP control base station 10. In other words, the RLC control base station 20 may transmit the response message to the PDCP control base station 10 immediately after receiving the data transmitted by the PDCP control base station 10 as long as the buffer of the RLC control base station 20 is not congested.

When the PDCP control base station 10 receives the response message from the RLC control base station 20, the PDCP control base station 10 slides the PDCP re-ordering window. For example, when the PDCP control base station 10 receives the response message from the RLC control base station 20 after transmitting the data of PDCP-SN: 2047 to the RLC control base station 20, the PDCP control base station 10 slides the PDCP re-ordering window and allocates PDCP-SN: 2048 to fresh data. When the PDCP control base station 10 receives the response message from the RLC control base station 20, the PDCP control base station may delete the PDCP-PDU that has been successfully transmitted to the UE from the buffer 12.

When the RLC control base station 20 does not receive the response message for the data of PDCP-SN: 2048 that has been concealed using HFN#2 from the UE, the RLC control base station 20 does not transmit the response message to the PDCP control base station 10.

In such a case, the PDCP control base station 10 does not slide the PDCP re-ordering window. Thus, as the data from the data of PDCP-SN: 2048 onward will not be transmitted to the RLC control base station 20, it is possible to prevent the data from being continuously accumulated in the buffer 22 of the RLC control base station 20.

Figure 5:
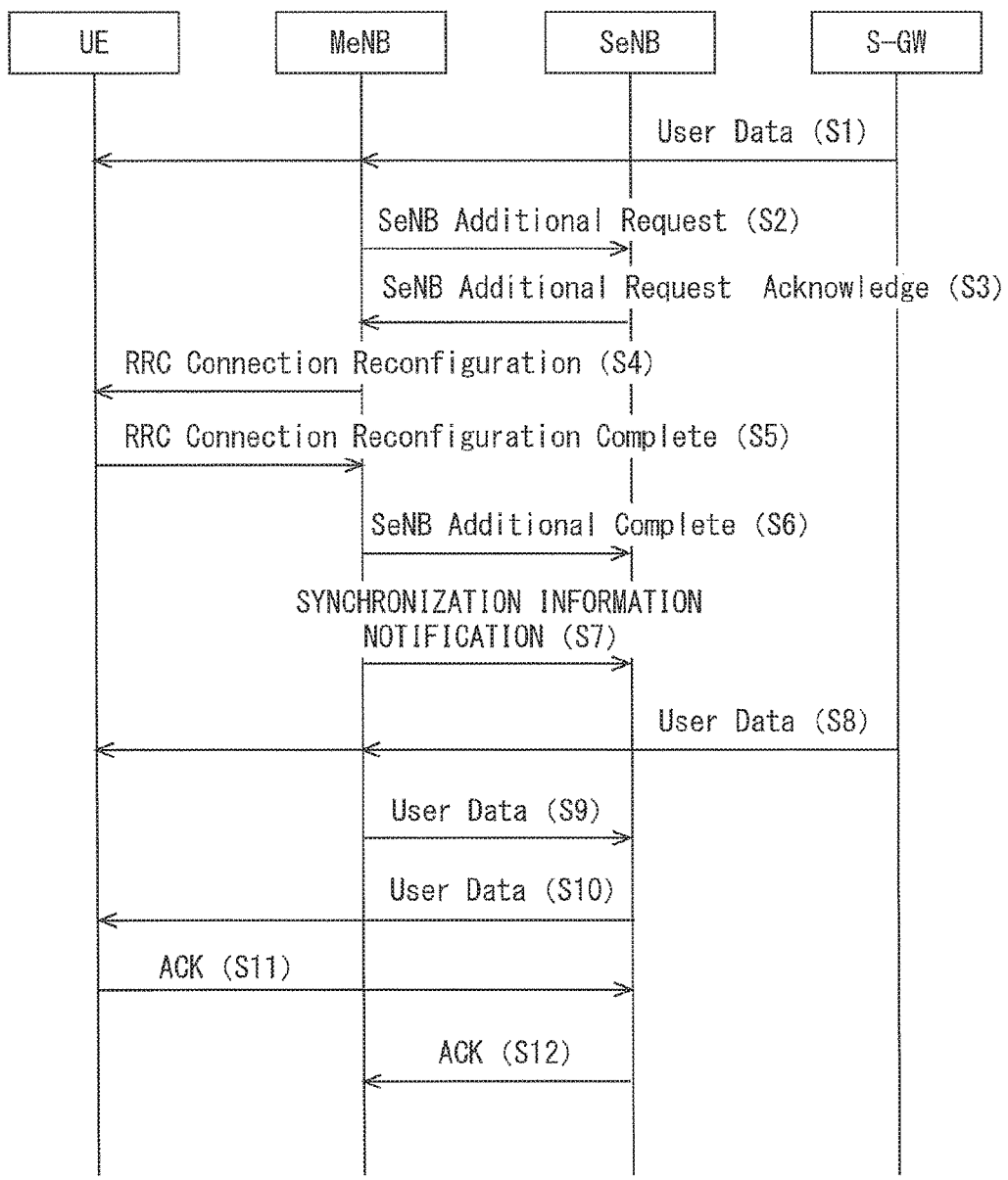
FIG. 5 is a drawing showing a flow of the synchronization process in a communication system according to the second exemplary embodiment.

Next, a flow of the synchronization process in the communication system according to the second exemplary embodiment of the present invention will be described with reference to FIG. 5. In FIG. 5, the PDCP control base station 10 is described as being a Master-eNB (MeNB), and the RLC control base station 20 is described as being a Secondary-eNB (SeNB). Further, an S-GW (Serving Gateway) is a device that relays User Data. The User Data differs from control data that performs call control and the like, and may be, for example, data being communicated among UEs such as audio data, image data, and the like.

Firstly, the S-GW transmits the User Data to the MeNB (S1). When the MeNB receives the User Data, the MeNB transmits the User Data to the UE.

Next, the MeNB transmits an SeNB Additional Request message to the SeNB (S2). The MeNB transmits the SeNB Additional Request message to the SeNB in order to establish the state of dual connectivity. The SeNB Additional Request message indicates that a session for communication between the SeNB and the UE is to be established. Next, the SeNB transmits an SeNB Additional Request Acknowledge message to the MeNB as a response message to the SeNB Additional Request message (S3).

Next, the MeNB transmits an RRC Connection Reconfiguration message to the UE (S4). The RRC Connection Reconfiguration message indicates that a session for communication between the UE and the SeNB is to be established. Next, the UE transmits an RRC Connection Reconfiguration Complete message to the MeNB as a response message to the RRC Connection Reconfiguration message (S5).

Next, the MeNB transmits an SeNB Additional Complete message indicating that the establishment of the session between the UE and the SeNB has been completed to the SeNB (S6). Next, the MeNB transmits a synchronization information notification message to the SeNB (S7). The synchronization information notification message includes information of the PDCP-PDU(s) that has been transmitted by the MeNB to the UE. For example, the synchronization information notification message includes the value(s) of the HFN(s) that is used to conceal the PDCP-PDU(s) that has been transmitted to the UE and the PDCP-SN(s) of the PDCP-PDU(s) that has been transmitted to the UE. When the SeNB receives the synchronization information notification message, the SeNB can recognize or determine the HFN(s) that is used to conceal the data to be transmitted to the UE and the PDCP-SN(s).

Next, the S-GW transmits the User Data to the MeNB (S8). The MeNB transmits the received User Data to the UE. Next, the MeNB executes the PDCP process on the received User Data and transmits the data on which the PDCP process has been executed to the SeNB (S9). Next, the SeNB executes the RLC process on the data transmitted by the MeNB and transmits the data on which the RLC process has been executed to the UE (S10).

Next, when the UE receives the User Data in the step S10, the UE transmits an ACK message to the SeNB (S11). Next, the SeNB transmits an ACK message indicating that the User Data has been successfully transmitted to the UE to the MeNB (S12). Further, by the dual connectivity, the UE receives different data from both the MeNB and the SeNB. Therefore, the UE transmits the ACK message to the transmitter of the data for every piece of received data.

When the MeNB receives the ACK message in the step S12, the MeNB slides the PDCP re-ordering window and transmits the next data to the SeNB. In this case, processes of the step S9 onward are repeatedly executed.

As described above, the PDCP control base station 10 can receive the ACK message from the RLC control base station 20 by using the PDCP control base station 10 and the RLC control base station 20 according to the second exemplary embodiment of the present invention. Thus, even when the base station that executes the PDCP control is a device different from the base station that executes the RLC control, the PDCP control base station 10 can recognize as to whether or not the RLC control base station 20 has successfully transmitted data to the UE.

In addition, as the PDCP control base station 10 slides the PDCP re-ordering window based on the ACK message transmitted by the RLC control base station 20, it is possible to prevent data from being continuously accumulated in the buffer 22 of the RLC control base station 20.

Still further, as the PDCP control base station 10 slides the PDCP re-ordering window based on the ACK message transmitted by the RLC control base station 20, the data transmitted by the PDCP control base station 10 can be synchronized with the data received by the mobile station 30.

In the above example, although it has been described that the PDCP control base station 10 receives the response message transmitted by the RLC control base station 20 for each PDCP-PDU, the PDCP control base station 10 may collectively transmit a plurality of PDCP-PDUs to the RLC control base station 20. In this case, the RLC control base station 20 may transmit the response message to the PDCP control base station 10 for each PDCP-PDU or may transmit one response message to the PDCP control base station 10 for the plurality of PDCP-PDUs.

Third Exemplary Embodiment

Next, a slide process of the PDCP re-ordering window according to a third exemplary embodiment of the present invention will be described with reference to FIG. 6.

Figure 6:
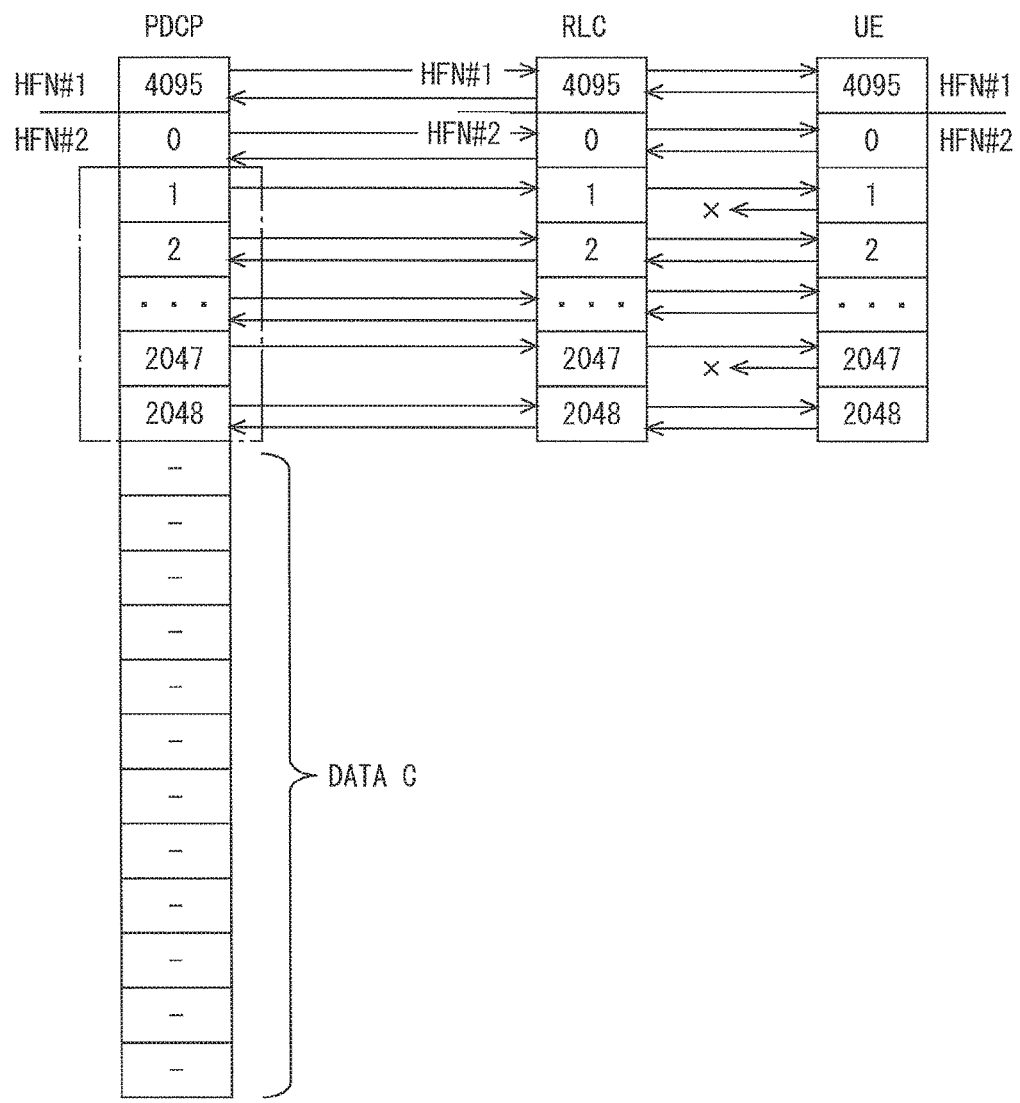
FIG. 6 is a drawing for describing a slide process of a PDCP re-ordering window according to a third exemplary embodiment.

It is shown in FIG. 6 that if the PDCP control base station 10 does not receive the response message (the ACK message) indicating that the RLC control base station 20 has successfully transmitted data to the UE, the PDCP control base station 10 slides the PDCP re-ordering window after a predetermined time, and the PDCP control base station 10 transmits data to which the PDCP-SN(s) has been newly allocated to the RLC control base station 20. In other words, when the PDCP control base station 10 receives the response message transmitted by the RLC control base station 20, the PDCP control base station 10 slides the PDCP re-ordering window, and even when the PDCP control base station 10 does not receive such a response message, the PDCP control base station 10 slides the PDCP re-ordering window after a predetermined period.

For example, if the RLC control base station 20 does not receive the response message from the UE after transmitting the data of PDCP-SN: 1 that has been concealed using HFN#2 to the UE, the RLC control base station 20 does not transmit the response message to the PDCP control base station 10. Even in such a case, the PDCP control base station 10 slides the PDCP re-ordering window after a predetermined period, and the PDCP control base station 10 transmits the data of PDC-SN: 2 to the RLC control base station 20. Further, even when the PDCP control base station 10 does not receive the response message for the data of PDCP-SN: 2047 that has been concealed using HFN#2 from the RLC control base station 20, the PDCP control base station 10 slides the PDCP re-ordering window after a predetermined period and then transmits the data of PDC-SN: 2048 to the RLC control base station 20. The predetermined period that represents a period from when the PDCP control base station 10 transmits data until the PDCP control base station 10 transmits the next data may be measured by, for example, the PDCP control base station 10 by using a timer.

Further, the RLC control base station 20 includes the PDCP-SN(s) of the data that has been successfully transmitted in the response message to be transmitted to the PDCP control base station 10. When the PDCP control base station 10 receives the response message including the PDCP-SN(s), the PDCP control base station 10 can recognize the PDCP-PDU(s) that has not been successfully transmitted to the UE.

The PDCP control base station 10 may delete the PDCP-PDU(s) that has not been successfully transmitted to the UE from the buffer 12. When a retransmission request is transmitted by the RLC control base station 20, the PDCP control base station 10 may retransmit the PDCP-PDU(s) that has not been successfully transmitted to the UE to the RLC control base station 20.

Figure 7:
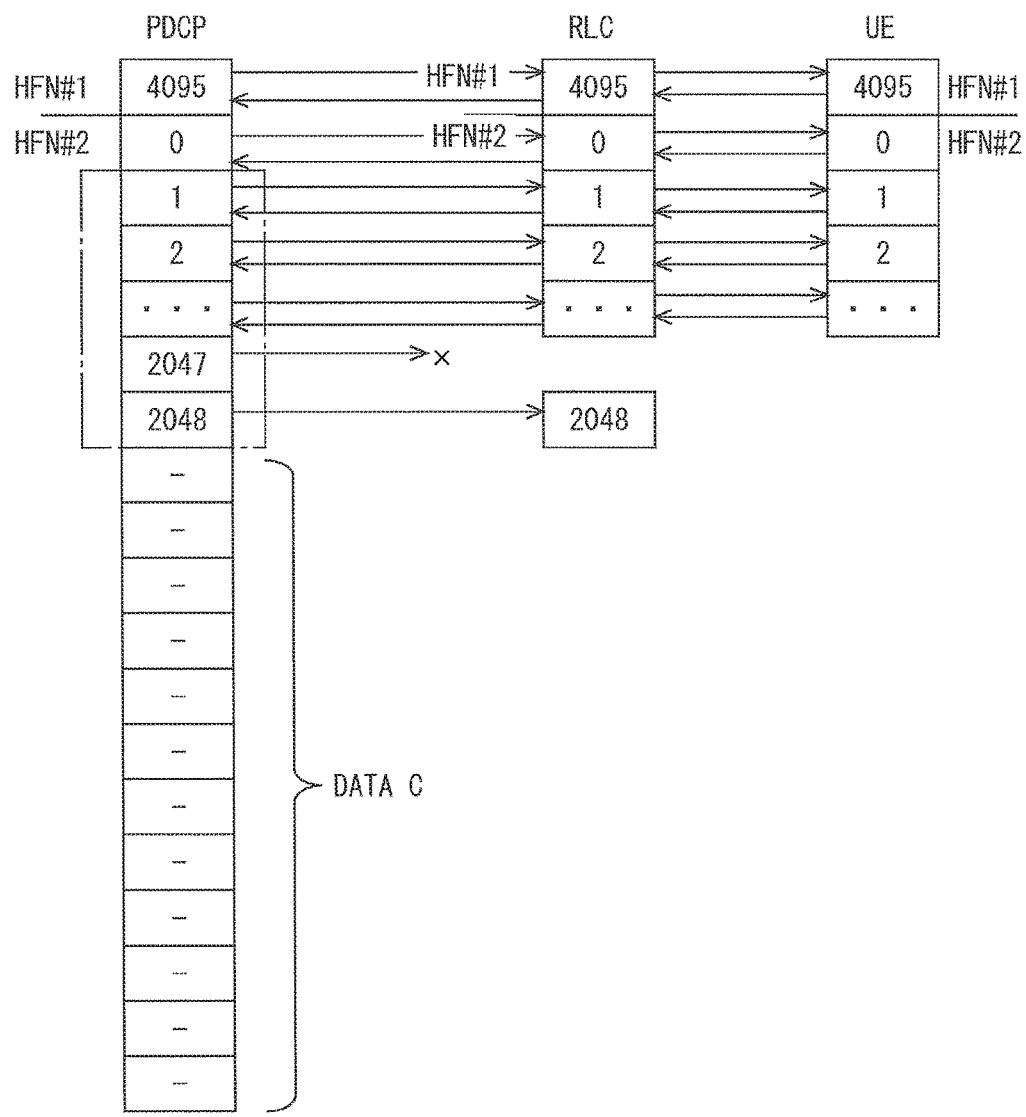
FIG. 7 is a drawing for describing the slide process on the PDCP re-ordering window according to the third exemplary embodiment.

Further, one of the cases in which the PDCP control base station 10 does not receive the response message for the transmitted PDCP-PDU is a case in which the RLC control base station 20 could not have received the data transmitted by the PDCP control base station 10, as shown in FIG. 7. Another one of the cases in which the PDCP control base station 10 does not receive the response message for the transmitted PDCP-PDU(s) may be a case in which, when the RLC control base station 20 transmits the response message to the PDCP control base station 10 after the RLC control base station 20 received the response message from the UE, the response message is discarded or the like in a communication path between the PDCP control base station 10 and the RLC control base station 20.

As described above, when the slide process of the PDCP re-ordering window according to the third exemplary embodiment of the present invention is executed, the PDCP control base station 10 can transmit the data to be transmitted next to the RLC control base station 20 after the predetermined period. Such a process is effective, for example, when the data could not have been transmitted data to the UE, and the data needs to be retransmitted to the UE. By performing such a process, throughput of the data to be transmitted to the UE can be improved.

Fourth Exemplary Embodiment

Figure 8:
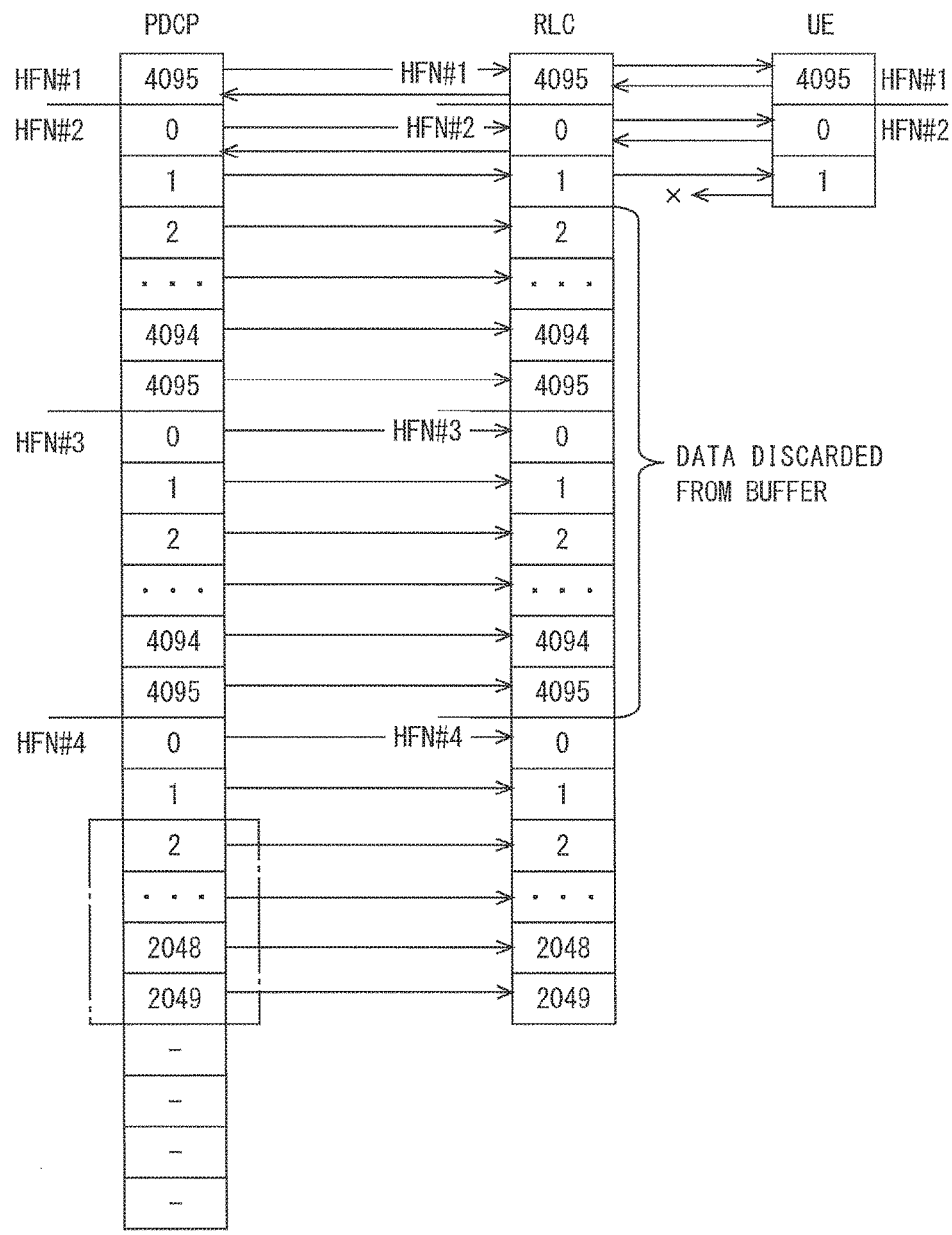
FIG. 8 is a drawing for describing a slide process of a PDCP re-ordering window according to a fourth exemplary embodiment.

Next, a slide process of the PDCP re-ordering window according to a fourth exemplary embodiment of the present invention will be described with reference to FIG. 8. As in FIG. 6, it is shown in FIG. 8 that even when the PDCP control base station 10 does not receive the response message from the RLC control base station 20, the PDCP control base station 10 slides the PDCP re-ordering window after a predetermined time and then transmits data to which a PDCP-SN(s) has been newly allocated to the RLC control base station 20. As shown in FIG. 8, as the RLC control base station 20 has not received the response message for the data of PDCP-SN: 1 that has been concealed using HFN#2, the RLC control base station 20 executes the process for retransmitting the data of PDCP-SN: 1 that has been concealed using HFN#2. At this time, suppose that data transmitted by the PDCP control base station 10 is continuously accumulated in the buffer 22 of the RLC control base station 20, and when the amount of the data transmitted by the PDCP control base station 10 exceeds an allowable amount of the buffer 22, the data from the data of PDCP-SN: 2 that has been concealed using HFN#2 to the data of PDCP-SN: 4095 that has been concealed using HFN#3, which are old data among the data pieces accumulated in the buffer 22, are discarded.

In such a case, suppose that the RLC control base station 20 completed retransmitting the data of PDCP-SN: 1 that has been concealed using HFN#2 and transmitted the response message including PDCP-SN: 1 to the PDCP control base station 10, and further, the RLC control base station 20 transmitted the next data to the UE. However, as the data from the data of PDCP-SN: 2 that has been concealed using HFN#2 to the data of the PDCP-SN: 4095 that has been concealed using HFN#3 has already been discarded, the RLC control base station 20 transmits the data of PDCP-SN: 0 that has been concealed using HFN#4 to the UE. However, as the UE assumes that it would receive the data that has been concealed using HFN#2, the UE decodes the received data using HFN#2. As the data transmitted by the RLC control base station 20 has been concealed using HFN#4, the UE cannot decode the received data transmitted by the RLC control base station 20. As another example, when the allowable amount of the buffer 22 is exceeded and newly arriving data is discarded, the HFN value that has been used to conceal the data transmitted by the RLC control base station 20 to the UE may differ from the HFN value expected by the UE. Thus, the UE cannot decode the received data transmitted by the RLC control base station 20.

That is, when the data is discarded in the buffer 22 of the RLC control base station 20, and the HFNs are not synchronized in the PDCP control base station 10 and the UE, the UE cannot decode the data.

In order to prevent such a phenomenon, the RLC control base station 20 includes the value(s) of the HFN(s) used to conceal the data together with the PDCP-SN(s) of the data that has been successfully transmitted in the response message to be transmitted to the PDCP control base station 10. For example, when the RLC control base station 20 has completed retransmitting the data of PDCP-SN: 1 that has been concealed using HFN#2, the RLC control base station 20 transmits the response message including PDCP-SN: 1 and HFN#2 to the PDCP control base station 10.

When the PDCP control base station 10 has already transmitted the data up to the data of PDCP-SN: 2049 that has been concealed using HFN#4 to the RLC control base station 20, and the PDCP control base station 10 has received the response message including PDCP-SN: 1 and HFN#2 from the RLC control base station 20, the PDCP control base station 10 retransmits the data from the data of PDCP-SN: 2 onward that has been concealed using HFN#2.

After the RLC control base station 20 transmits the response message including the HFN, the RLC control base station 20 transmits the data that has been retransmitted by the PDCP control base station 10 to the UE.

As described above, as the RLC control base station 20 transmits the response message including the HFN value(s) to the PDCP control base station 10, the PDCP control base station 10 can recognize data that has not been transmitted by the RLC control base station 20 to the UE. Accordingly, it is possible to synchronize the HFN value(s) used by the UE to decode data with the HFN value(s) that has been used to conceal the data transmitted to the UE. It is thus possible for the UE to decode the received data.

Fifth Exemplary Embodiment

Figure 9:
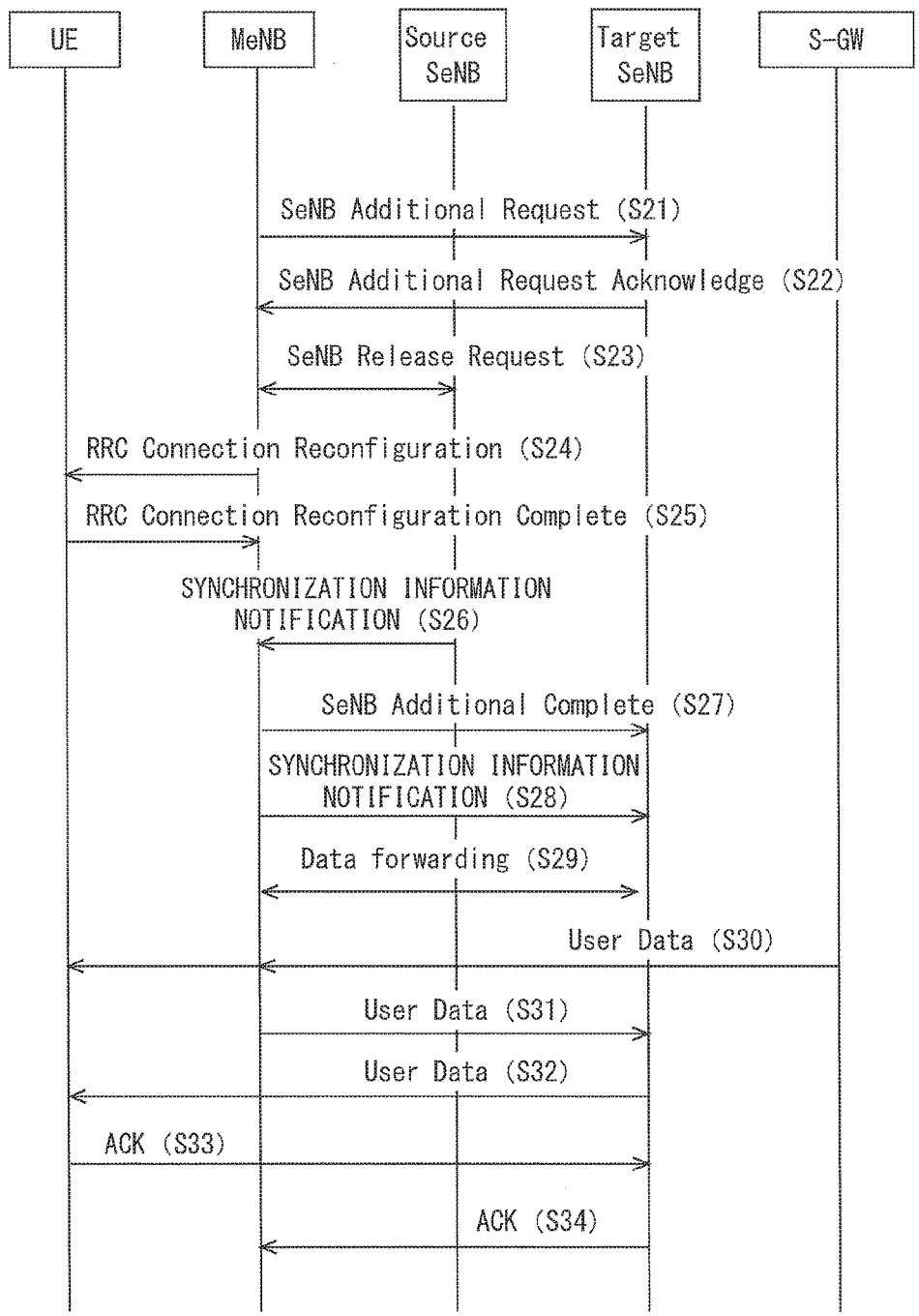
FIG. 9 is a drawing showing a flow of a synchronization process in a communication system according to a fifth exemplary embodiment.

Next, a flow of a synchronization process in the communication system according to a fifth exemplary embodiment of the present invention will be described with reference to FIG. 9. In FIG. 9, a flow of a process in which the UE is handed over from a communication area of a Source SeNB to a communication area of a Target SeNB is shown. Suppose that the UE has received data transmitted by the MeNB and the Source SeNB by the dual connectivity.

Firstly, when the UE moves from a communication area of the Source SeNB to a communication area of the Target SeNB, the MeNB transmits an SeNB Additional Request message to the Target SeNB (S21). The SeNB Additional Request message indicates that a session for communication between the Target SeNB and the UE is to be established. Next, the Target SeNB transmits an SeNB Additional Request Acknowledge message to the MeNB as a response message to the SeNB Additional Request message (S22).

Next, an SeNB Release Request message is transmitted and received between the MeNB and the Source SeNB (S23). The SeNB Release Request message is used to release a communication resource used in the communication between the MeNB and the Source SeNB.

Next, the MeNB transmits an RRC Connection Reconfiguration message to the UE (S24). The RRC Connection Reconfiguration message indicates that a session for communication between the UE and the Target SeNB is to be established. Next, the UE transmits an RRC Connection Reconfiguration Complete message to the MeNB as a response message to the RRC Connection Reconfiguration message (S25).

Next, the Source SeNB transmits a synchronization information notification message to the MeNB (S26). The synchronization information notification message includes information of the PDCP-PDU(s) that has been transmitted to the UE by the Source SeNB. For example, the synchronization information notification message includes the value(s) of the HFN(s) that has been used to conceal the PDCP-PDU(s) that has been transmitted to the UE and the PDCP-SN(s).

Next, the MeNB transmits an SeNB Additional Complete message indicating that the establishment of the session between the UE and the Target SeNB has been completed to the Target SeNB (S27). Next, the MeNB transmits the synchronization information notification message that has been transmitted by the Source SeNB to the Target SeNB (S28). When the Source SeNB receives the synchronization information notification message, the Source SeNB can recognize or determine the HFN(s) that has been used to conceal the data to be transmitted to the UE and the PDCP-SN(s).

Next, data that has not been transmitted to the UE by the MeNB, the Source SeNB, and the Target SeNB is forwarded to the Target SeNB (S29). For example, the Source SeNB may transmit the data not transmitted to the UE to the MeNB. In such a case, the MeNB may transmit the data transmitted by the Source SeNB to the UE or to the Target SeNB. Alternatively, the Source SeNB may transmit the data not transmitted to the UE to the Target SeNB.

As the steps S30 to S34 are the same as the steps S8 to S12 shown in FIG. 5, respectively, detailed descriptions thereof will be omitted.

As has been described above, when the communication system according to the fifth exemplary embodiment of the present invention executes the synchronization process, the MeNB can receive the ACK message indicating that the Target SeNB has successfully transmitted data to the UE even when the UE is handed over. Accordingly, the fifth exemplary embodiment can achieve the same advantages as those achieved by the first to fourth exemplary embodiments.

Sixth Exemplary Embodiment

Figure 10:
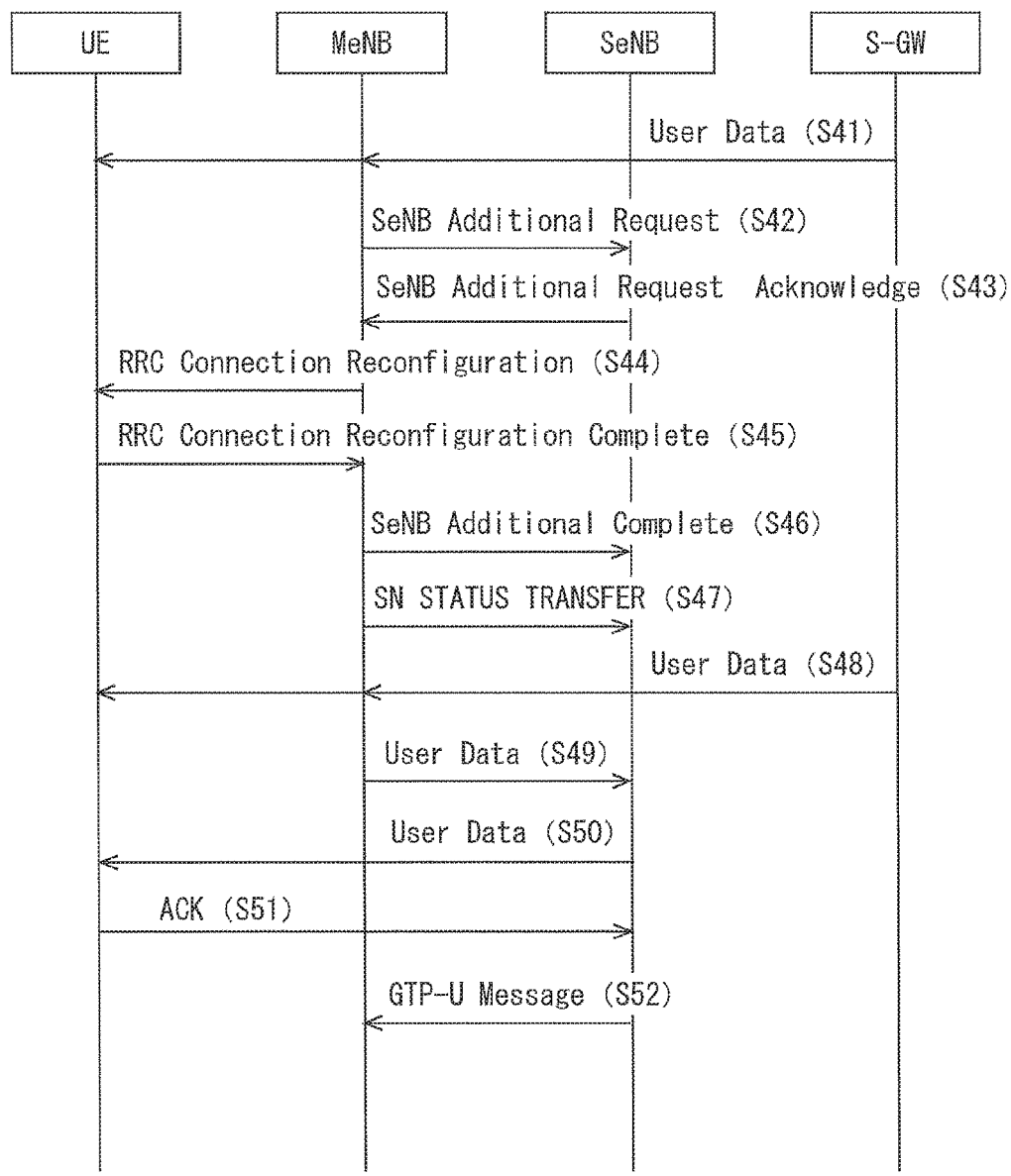
FIG. 10 is a drawing showing a flow of a synchronization process in a communication system according to a sixth exemplary embodiment.

Next, a flow of a synchronization process in a communication system according to a sixth exemplary embodiment of the present invention will be described with reference to FIG. 10. In FIG. 10, specific messages used for the transmission of the PDCP-SN(s) and the HFN(s) will be described. As the steps S41 to S46 are the same as the steps S1 to S6 shown in FIG. 5, respectively, detailed descriptions thereof will be omitted.

In the step S47, the MeNB notifies the SeNB of the value(s) of the HFN(s) that has been used to conceal the PDCP-PDU(s) transmitted to the UE and the PDCP-SN(s) using an SN STATUS TRANSFER message. The SN STATUS TRANSFER message is an existing message defined by 3GPP. The SN STATUS TRANSFER message will be described with reference to FIGS. 11 to 13 below.

FIG. 11 shows a PDCP-SN and an HFN, which will be included in the SN STATUS TRANSFER message. The PDCP-SN and the HFN are included as parameters that constitute a Count Value parameter. The SN STATUS TRANSFER message in FIG. 11 may be transmitted to the SeNB for each PDCP-PDU that has been transmitted to the UE. The HFN value that has been used to conceal the PDCP-PDU that has been transmitted to the UE and the PDCP-SN of the PDCP-PDU that has been transmitted to the UE are included in the SN STATUS TRANSFER message shown in FIG. 11.

FIG. 12 shows an HNF and a plurality of PDCP-SNs to be included in the SN STATUS TRANSFER message. It is shown in the SN STATUS TRANSFER message in FIG. 12 that the MeNB has transmitted PDCP-SN: 1 to PDCP-SN: n to the UE. Further, it is shown in the SN STATUS TRANSFER message in FIG. 12 that the HFN value that has been used to conceal the PDCP-PDUs of PDCP-SN: 1 to PDCP-SN: n is included.

FIG. 13 shows the SN STATUS TRANSFER message that represents the statuses of the plurality of PDCP-SNs using a bitmap. By using the SN STATUS TRANSFER message in FIG. 13, the MeNB can notify the SeNB of the transmission statuses of the PDCP-SNs using the bitmap image.

Referring again to FIG. 10, as the steps S48 to S51 are the same as the steps S8 to S11 in FIG. 5, respectively, detailed descriptions thereof will be omitted. In the step S52, the SeNB transmits the HFN value(s) that has been used to conceal the PDCP-PDU(s) that has been successfully transmitted to the UE and the PDCP-SN(s) using a GTP-U Message to the MeNB. The GTP-U Message will be described with reference to FIGS. 14 to 17 below.

FIG. 14 shows a configuration of a GTP-U protocol header (GTP-U message header) defined by 3GPP. The HFN value and the PDCP-SN are set in a Next Extension Header Type.

FIG. 15 shows that a new header type for identifying information related to the PDCP-SN and the HFN is newly added to a GTP-U Extension header type.

FIG. 16 shows a parameter region image of an Extension Header in which the newly added PDCP-SN and HFN in FIG. 15 are set.

FIG. 17 is an image showing that new information elements of PDCP-SN and HFN are added to the GTP-U Message type.

As described above, when the MeNB notifies the SeNB of the HFN value(s) that has been used to conceal the PDCP-PDU(s) that has been transmitted to the UE and the PDCP-SN(s), or the SeNB notifies the MeNB of the HFN value(s) that has been used to conceal the PDCP-PDU(s) that has been transmitted to the UE and the PDCP-SN(s), the SN STATUS TRANSFER message and the GTP-U Message that are used by 3GPP as existing messages can be used.

Further in the step S47 of FIG. 10, although it is shown that the MeNB uses the SN STATUS TRANSFER message to transmit the PDCP-SN(s) and the HFN(s) to the SeNB, the MeNB may use other messages to transmit the PDCP-SN(s) and the HFN(s) to the SeNB. For example, the MeNB may use the SeNB Additional Request message in the step S42 to transmit the PDCP-SN(s) and the HFN(s) to the SeNB. Alternatively, the MeNB may use the SeNB Additional Complete message in the step S46 to transmit the PDCP-SN(s) and the HFN(s) to the SeNB.

Alternatively, the MeNB may use the GTP-U Message to transmit the PDCP-SN(s) and the HFN(s) to the SeNB when the User Data is transmitted in the step S49. Alternatively, the MeNB may use a Frame protocol other than GTP-U in the GTP-U layer or may use a unique message to transmit the PDCP-SN(s) and the HFN(s) to the SeNB. Alternatively, the MeNB may use another Frame protocol in a layer different from the GTP-U layer to transmit the PDCP-SN(s) and the HFN(s) to the SeNB.

Seventh Exemplary Embodiment

Next, a configuration example of a communication system according to a seventh exemplary embodiment will be described. In FIG. 2, although it has been described that the PDCP control base station 10 includes the PDCP control unit 11 and the RLC control unit 13, the PDCP control base station 10 may include only the PDCP control unit 11. That is, the PDCP control base station 10 may not execute the RLC control that is executed by the RLC control unit 13 and instead only the RLC control base station 20 may execute the RLC control or a plurality of the RLC control base stations may execute the RLC control.

Figure 18:
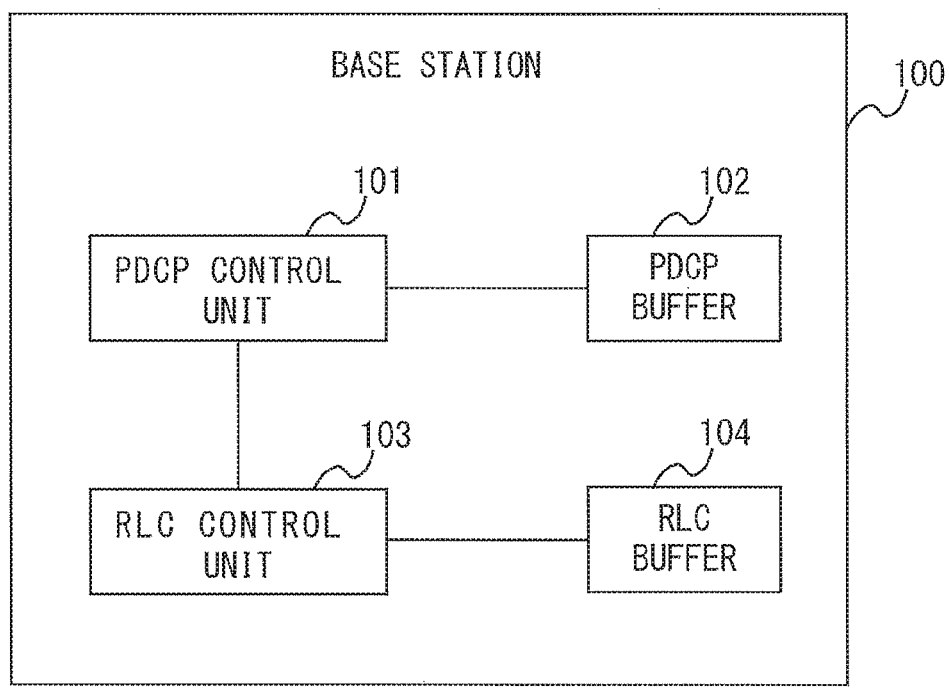
FIG. 18 is a configuration diagram of a base station according to a seventh exemplary embodiment.

FIG. 18 shows a configuration in which the PDCP control unit and the RLC control unit use buffers different from each other in one base station. A base station 100 in FIG. 18 includes a PDCP control unit 101, a PDCP buffer 102, an RLC control unit 103, and an RLC buffer 104. The PDCP control unit 101 extracts data stored in the PDCP buffer 102 and executes the PDCP control on the extracted data. The PDCP control unit 101 outputs the data on which the PDCP control has been executed to the RLC control unit 103.

The RLC control unit 103 temporarily stores the data output by the PDCP control unit 101 in the RLC buffer 104. After that, the RLC control unit 103 extracts the data stored in the RLC buffer 104 and executes the RLC control on the extracted data. The RLC control unit 103 transmits the data on which the RLC control is executed to the mobile station 30.

In the base station 100, the PDCP buffer 102 and the RLC buffer 104 are arranged in memory regions or memory spaces that are different from each other. That is, the PDCP control unit 101 and the RLC control unit 103 cannot share the same memory space. Further, the PDCP control unit 101 cannot refer to the RLC buffer 104, and the RLC control unit 103 cannot refer to the PDCP buffer 102.

That is, in the base station 100, the PDCP control unit 101, the PDCP buffer 102, the RLC control unit 103, and the RLC buffer 104 are arranged in the same device. However, the PDCP control unit 101 and the RLC control unit 103 can refer to limited buffers.

For example, in the base station 100, the PDCP control unit 101 and the PDCP buffer 102 may be mounted on a chip that is different from a chip on which the RLC control unit 103 and the RLC buffer 104 are mounted. Alternatively, the PDCP control unit 101 and the PDCP buffer 102 may be mounted on a board different from a board on which the RLC control unit 103 and the RLC buffer 104 are mounted.

In a further alternative, software may be used to control the PDCP control unit 101 not to refer to the RLC buffer 104. Likewise, software may be used to control the RLC control unit 103 not to refer to the PDCP buffer 102

As described above, the same advantages as those achieved by the other exemplary embodiments can be achieved in this exemplary embodiment in an environment in which the PDCP control unit 101 cannot refer to the RLC buffer 104, i.e., the PDCP control unit 101 and the RLC control unit 103 do not share a memory space in the same device, in addition to the case when the PDCP control unit 101 and the RLC control unit 103 are arranged in devices different from each other.

In the above exemplary embodiments, although the present invention has been described as a configuration of hardware, the present invention is not limited to this. In the present invention, the processes executed by the PDCP control base station 10 (MeNB) or the RLC control base station 20 (SeNB) shown in FIGS. 5, 9, and 10 can be achieved by causing a CPU (Central Processing Unit) to execute a computer program.

In the above example, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Note that the present invention is not limited to the above exemplary embodiments, and various modifications can be made without departing from the scope of the invention.

Although the present invention has been described with reference to the exemplary embodiments, the present invention is not limited by the above. Various modifications, obvious to those skilled in the art, can be made to the configurations and details of the present invention within the scope of the invention.

The present application is based upon and claims the benefit of priority from Japanese Patent Application No. 2014-095789, filed on May 7, 2014, the entire contents of which are hereby incorporated by reference.

REFERENCE SIGNS LIST

10 PDCP Control Base Station
11 PDCP Control Unit
12 Buffer
13 RLC Control Unit
20 RLC Control Base Station
21 RLC Control Unit
22 Buffer
30 Mobile Station
100 Base Station
101 PDCP Control Unit
102 PDCP Buffer
103 RLC Control Unit
104 RLC Buffer

The invention claimed is:

1. A communication system comprising:
a first base station comprises:
    at least one memory storing instructions, and
    at least one processor configured to execute the instructions to;
    execute a process in a PDCP (Packet Data Control Protocol) layer; and
a second base station comprises:
    at least one memory storing instructions, and
    at least one processor configured to execute the instructions to;
    execute a process in an RLC (Radio Link Control) layer on data transmitted by the first base station, and
    transmit the data on which the process in the RLC layer has been executed to a mobile station,
wherein
when the first base station receives user data addressed to the mobile station, the at least one processor of the first base station is further configured to execute the instructions to transmit a SeNB Additional Request as a session additional request message to the second base station and instruct the second base station to establish a session with the mobile station,
the at least one processor of the first base station is further configured to execute the instructions to execute the process in the RLC layer in the first base station, transmit the user data to the mobile station, and include a PDCP PDU (Protocol Data Unit) sequence number of a PDCP PDU that has been successfully transmitted to the mobile station and a HFN (Hyper Frame Number) used to conceal the PDCP PDU that has been successfully transmitted to the mobile station in the SeNB Additional Request, the at least one processor of the second base station is further configured to execute the instructions to transmit a response message to the first base station when the data has been successfully transmitted to the mobile station, and
the at least one processor of the first base station is further configured to execute the instructions to transmit data to be transmitted next to the second base station when the first base station receives the response message.

2. The communication system according to claim 1, wherein when the first base station receives the user data addressed to the mobile station, the at least one processor of the first base station is further configured to execute the instructions to transmit a RRC Connection Reconfiguration to the mobile station and instruct the mobile station to establish a session with the second base station.

3. The communication system according to claim 2, wherein when the first base station receives a RRC Connection Reconfiguration Complete indicating that the session with the second base station has been established from the mobile station, the at least one processor of the first base station is further configured to execute the instructions to transmit a session additional completion message indicating that the mobile station has established the session with the second base station to the second base station.

4. he communication system according to claim 3, wherein the at least one processor of the first base station is further configured to execute the instructions to execute the process in the RLC layer in the first base station, transmit the user data to the mobile station, and transmit the PDCP PDU (Protocol Data Unit) sequence number of the PDCP PDU that has been successfully transmitted to the mobile station and the HFN (Hyper Frame Number) used to conceal the PDCP PDU that has been successfully transmitted to the mobile station to the second base station.

5. The communication system according to claim 3, wherein the at least one processor of the first base station is further configured to execute the instructions to transmit the SeNB Additional Complete as the session additional completion message.

6. The communication system according to claim 5, wherein the at least one processor of the first base station is further configured to execute the instructions to execute the process in the RLC layer in the first base station, transmit the user data to the mobile station, and include the PDCP PDU (Protocol Data Unit) sequence number of the PDCP PDU that has been successfully transmitted to the mobile station and the HFN (Hyper Frame Number) used to conceal the PDCP PDU that has been successfully transmitted to the mobile station in the SeNB Additional Complete.

7. A communication method comprising:
when a first base station receives user data addressed to a mobile station, the first base station transmits an SeNB Additional Request as a session additional request message to a second base station and instructs the second base station to establish a session with the mobile station
the first base station executes the process in an RLC (Radio Link Control) layer in the first base station, transmits the user data to the mobile station, and includes a PDCP (Packet Data Control Protocol) PDU (Protocol Data Unit) sequence number of a PDCP PDU that has been successfully transmitted to the mobile station and a HFN (Hyper Frame Number) used to conceal the PDCP PDU that has been successfully transmitted to the mobile station in the SeNB Additional Request;

executing a process in the RLC layer on data transmitted by the first base station by the second base station, a process in a PDCP layer having been executed on the data;

transmitting the data to a mobile station, the process in the RLC layer having been executed on the data by the second base station;

transmitting a response message by the second base station to the first base station when the data is successfully transmitted by the second base station to the mobile station; and transmitting data to be transmitted next by the first base station to the second base station when the first base station receives the response message.

8. The communication method according to claim 7, wherein when the first base station receives the user data addressed to the mobile station, the first base station transmits a RRC Connection Reconfiguration to the mobile station and instructs the mobile station to establish a session with the second base station.

9. The communication method according to claim 8, wherein when the first base station receives a RRC Connection Reconfiguration Complete indicating that the session with the second base station has been established from the mobile station, the first base station transmits a session additional completion message indicating that the mobile station has established the session with the second base station to the second base station.

10. The communication method according to claim 9, wherein the first base station executes the process in the RLC layer in the first base station, transmits the user data to the mobile station, and transmits the PDCP PDU (Protocol Data Unit) sequence number of the PDCP PDU that has been successfully transmitted to the mobile station and the HFN (Hyper Frame Number) used to conceal the PDCP PDU that has been successfully transmitted to the mobile station to the second base station.

11. The communication method according to claim 9, wherein the first base station transmits the SeNB Additional Complete as the session additional completion message.

12. The communication method according to claim 11, wherein the first base station executes the process in the RLC layer in the first base station, transmits the user data to the mobile station, and includes the PDCP PDU (Protocol Data Unit) sequence number of the PDCP PDU that has been successfully transmitted to the mobile station and the HFN (Hyper Frame Number) used to conceal the PDCP PDU that has been successfully transmitted to the mobile station in the SeNB Additional Complete.

13. The communication method according to claim 12, wherein the second base station transmits the user data to the mobile station using the PDCP PDU sequence number and the HFN included in the SeNB Additional Complete.

14. The communication method according to claim 7, wherein
when the mobile station moves from a communication area of the second base station to a communication area of a third base station, the second base station transmits the PDCP PDU sequence number of the PDCP PDU (Protocol Data Unit) that has been successfully transmitted to the mobile station and the HFN used to conceal the PDCP PDU that has been successfully transmitted to the mobile station to the first base station, and when the first base station receives the RRC Connection Reconfiguration Complete indicating that the session with the third base station has been established from the mobile station, the first base station includes the PDCP PDU sequence number transmitted by the second base station and the HFN (Hyper Frame Number) in the session additional completion message indicating that the mobile station has established the session with the third base station and then transmits the session additional completion message to the third base station.

* * * * *